US007869350B1

(12) United States Patent  (10) Patent No.: US 7,869,350 B1
Bryant et al.  (45) Date of Patent: Jan. 11, 2011

(54) METHOD AND APPARATUS FOR DETERMINING A DATA COMMUNICATION NETWORK REPAIR STRATEGY

(75) Inventors: Stewart Frederick Bryant, Redhill (GB); Kevin George Miles, Reading (GB); Ian Michael Charles Shand, Cobham (GB)

(73) Assignee: Cisco Technology, Inc., San Jose, CA (US)

( * ) Notice: Subject to any disclaimer, the term of this patent is extended or adjusted under 35 U.S.C. 154(b) by 1233 days.

(21) Appl. No.: 10/346,051

(22) Filed: Jan. 15, 2003

(51) Int. Cl.
*H04J 1/16* (2006.01)
(52) U.S. Cl. ............... 370/228; 242/225; 242/248
(58) Field of Classification Search ............... 370/216, 370/235, 395, 52, 395.41, 412, 417, 418, 370/419, 429, 238, 242, 248, 250, 216.217, 370/218, 219, 220, 225, 228, 227, 221
See application file for complete search history.

(56) References Cited

U.S. PATENT DOCUMENTS

| | | | |
|---|---|---|---|
| 4,956,835 A * | 9/1990 | Grover ................ 370/228 |
| 5,243,592 A | 9/1993 | Perlman et al. |
| 5,253,248 A | 10/1993 | Dravida et al. |
| 5,825,772 A | 10/1998 | Dobbins et al. |
| 5,959,968 A | 9/1999 | Chin et al. |
| 5,999,286 A * | 12/1999 | Venkatesan ............... 398/5 |
| 6,002,674 A | 12/1999 | Takei et al. |
| 6,032,194 A | 2/2000 | Gai et al. |
| 6,044,075 A | 3/2000 | Le Boudec et al. |
| 6,098,107 A | 8/2000 | Narvaez-Guarnieri et al. |
| 6,111,257 A | 8/2000 | Shand et al. |
| 6,128,750 A | 10/2000 | Espy et al. |
| 6,148,410 A * | 11/2000 | Baskey et al. ............. 714/4 |
| 6,185,598 B1 | 2/2001 | Farber et al. |
| 6,243,754 B1 | 6/2001 | Guerin et al. |
| 6,246,669 B1 * | 6/2001 | Chevalier et al. ........ 370/238 |
| 6,256,295 B1 | 7/2001 | Callon |
| 6,295,275 B1 | 9/2001 | Croslin |
| 6,321,271 B1 | 11/2001 | Kodialam et al. |
| 6,343,122 B1 | 1/2002 | Andersson |
| 6,347,078 B1 | 2/2002 | Narvaez-Guarnieri et al. |
| 6,349,091 B1 | 2/2002 | Li |

(Continued)

FOREIGN PATENT DOCUMENTS

CN     1440159 A     9/2003

(Continued)

OTHER PUBLICATIONS http://en.wikipedia.org/wiki/IP_protocol, Oct. 28, 2006.*

(Continued)

*Primary Examiner*—Huy D Vu
*Assistant Examiner*—Dady Chery
(74) *Attorney, Agent, or Firm*—Hickman Palermo Truong & Becker LLP (57) ABSTRACT

A method is disclosed for determining a repair strategy for a data communication network. The data communication network has as components nodes and links. The method comprises a step of implementing a link repair strategy for an adjacent link to an adjacent node. The method further monitors for a probe packet to the adjacent node and, if such a packet is received, implements a node repair strategy.

24 Claims, 5 Drawing Sheets

U.S. PATENT DOCUMENTS

| | | | |
|---|---|---|---|
| 6,356,546 | B1 | 3/2002 | Beshai |
| 6,389,764 | B1 | 5/2002 | Stubler et al. |
| 6,473,421 | B1 | 10/2002 | Tappan |
| 6,507,577 | B1 | 1/2003 | Mauger et al. |
| 6,535,481 | B1 | 3/2003 | Andersson et al. |
| 6,578,086 | B1 | 6/2003 | Regan et al. |
| 6,668,282 | B1 | 12/2003 | Booth et al. |
| 6,690,671 | B1 | 2/2004 | Anbiah et al. |
| 6,697,325 | B1 | 2/2004 | Cain |
| 6,704,320 | B1 | 3/2004 | Narvaez et al. |
| 6,711,125 | B1 | 3/2004 | Walrand et al. |
| 6,714,551 | B1 | 3/2004 | Le-Ngoc |
| 6,718,382 | B1 * | 4/2004 | Li et al. ............... 709/224 |
| 6,778,531 | B1 | 8/2004 | Kodialam et al. |
| 6,829,215 | B2 | 12/2004 | Tornar |
| 6,928,484 | B1 | 8/2005 | Huai et al. |
| 6,944,131 | B2 | 9/2005 | Beshai et al. |
| 6,950,870 | B2 * | 9/2005 | Beaulieu ............... 709/224 |
| 6,982,951 | B2 | 1/2006 | Doverspike et al. |
| 6,996,065 | B2 | 2/2006 | Kodialam et al. |
| 7,058,016 | B1 | 6/2006 | Harper |
| 7,099,286 | B1 | 8/2006 | Swallow |
| 7,113,481 | B2 | 9/2006 | Elie-Dit-Cosaque et al. |
| 7,158,486 | B2 | 1/2007 | Rhodes |
| 7,177,295 | B1 | 2/2007 | Sholander et al. |
| 7,242,664 | B2 | 7/2007 | Einstein et al. |
| 7,260,645 | B2 * | 8/2007 | Bays ............... 709/238 |
| 7,274,654 | B2 | 9/2007 | Yang et al. |
| 7,274,658 | B2 | 9/2007 | Bornstein et al. |
| 7,349,427 | B1 | 3/2008 | Canning et al. |
| 7,420,989 | B2 | 9/2008 | Liu et al. |
| 7,490,165 | B1 | 2/2009 | Katukam et al. |
| 2002/0021671 | A1 * | 2/2002 | Quinlan ............... 370/242 |
| 2002/0037010 | A1 | 3/2002 | Yamauchi |
| 2002/0062388 | A1 * | 5/2002 | Ogier et al. ............... 709/238 |
| 2002/0093954 | A1 | 7/2002 | Weil et al. |
| 2002/0112072 | A1 | 8/2002 | Jain |
| 2002/0116669 | A1 * | 8/2002 | Jain ............... 714/43 |
| 2002/0131362 | A1 | 9/2002 | Callon |
| 2002/0136223 | A1 | 9/2002 | Ho |
| 2002/0171886 | A1 | 11/2002 | Wu et al. |
| 2002/0172157 | A1 | 11/2002 | Rhodes |
| 2003/0063613 | A1 | 4/2003 | Carpini et al. |
| 2003/0079040 | A1 | 4/2003 | Jain et al. |
| 2003/0117950 | A1 | 6/2003 | Huang |
| 2003/0123457 | A1 | 7/2003 | Koppol |
| 2003/0193958 | A1 | 10/2003 | Narayanan |
| 2003/0193959 | A1 | 10/2003 | Lui et al. |
| 2003/0210705 | A1 * | 11/2003 | Seddigh et al. ............... 370/419 |
| 2004/0001497 | A1 | 1/2004 | Sharma |
| 2004/0001508 | A1 | 1/2004 | Zheng et al. |
| 2004/0071089 | A1 | 4/2004 | Bauer et al. |
| 2004/0085894 | A1 | 5/2004 | Wang et al. |
| 2004/0117251 | A1 | 6/2004 | Shand |
| 2004/0151181 | A1 | 8/2004 | Chu et al. |
| 2005/0007950 | A1 | 1/2005 | Liu |
| 2005/0013241 | A1 | 1/2005 | Beller et al. |
| 2005/0031339 | A1 | 2/2005 | Qiao et al. |
| 2005/0038909 | A1 | 2/2005 | Yoshiba et al. |
| 2005/0071709 | A1 | 3/2005 | Rosenstock et al. |
| 2005/0097219 | A1 | 5/2005 | Goguen et al. |
| 2005/0265228 | A1 | 12/2005 | Fredette et al. |
| 2006/0018253 | A1 | 1/2006 | Windisch et al. |
| 2006/0221962 | A1 | 10/2006 | Previdi et al. |
| 2006/0291446 | A1 | 12/2006 | Caldwell et al. |
| 2007/0011284 | A1 | 1/2007 | Le Roux et al. |
| 2007/0011351 | A1 | 1/2007 | Bruno et al. |
| 2007/0038767 | A1 | 2/2007 | Miles et al. |
| 2008/0025203 | A1 | 1/2008 | Tallet |
| 2008/0089227 | A1 | 4/2008 | Guichard et al. |

FOREIGN PATENT DOCUMENTS

| | | |
|---|---|---|
| WO | WO 01/78278 A1 | 10/2001 |
| WO | WO 02/06918 | 1/2002 |

OTHER PUBLICATIONS http://en.wikipedia.org/wiki/Ping, Jan. 17, 2007.*
Wang, Zheng et al., "Shortest Path First with Emergency Exits," ACM 089791-405-8/90/0009/0166, 1990, pp. 166-176.
International Searching Authority, International Search Report, PCT/US04/33827, dated Mar. 28, 2005, 8 pages.
Current Claims, PCT/US04/33827, 6 pages.
Mikkel Thorup, "Fortifying OSPF/IS-IS against link-failure," Sep. 7, 2001, pp. 1-10.
Notification of Transmittal of the International Search Report and the Written Opinion of the International Searching Authority, or the Declaration as received in corresponding International application No. PCT/US06/06238.
Pending claims in PCT/US06/06238.
International Searching Authority, "Notification of Transmittal of the International Search Report and the Written Opinion of the International Searching Authority, or the Declaration", international application No. PCT/US06/28083, Received Nov. 30, 2007, 11 pages.
Claims, international application No. PCT/US06/28083, 3 pages.
AU Examiner's First Report for foreign patent application No. 2004311004 dated Jun. 23, 2008 (1 pg).
AU Examiner's Second Report for foreign patent application No. 2004311004 dated Aug. 18, 2008 (1 pg).
Current claims for AU foreign patent application No. 2004311004 (6 pgs).
Office Action from CN for foreign application No. 200480033007.8 dated Apr. 11, 2008 (10 pgs) with English translation (11 pgs).
Current claims for CN foreign patent application No. 200480033007.8 (6 pgs).
European Patent Office, "Supplementary European Search Report", application No. EP 04795045, May 27, 2009, 4 pages.
Claims, application No. EP 04795045, 4 pages.
Raju et al., "A New Approach to On-Demand Loop-Free Multipath Routing", Computer Communications and Networks, 1999, IEEE, Oct. 1999, XP010359531, ISBN: 978-0-7803-5794-5, 6 pages.
State Intellectual Property Office of the People'S Republic of China, "The First Office Action", filing No. 200680001652.0, May 8, 2009, 15 pages.
Claims, filing No. 200680001652.0, 4 pages.
European Patent Office, "Supplementary European Search Report", application No. EP 06720965, dated Jul. 21, 2009, 6 pages.
Claims, application No. EP 06720965, 4 pages.
European Patent Office, "Communication pursuant to Article 94(3) EPC", Application No. 04795045.6-2416, dated Sep. 7, 2009, 5 pages.
Current Claims, Application No. 04795045.6-2416, 5 pages.
Moy, J et al., "OSPF Version 2", IETF Standard, Network Working Group, Internet Engineering Task Force, IETF, Apr. 1998, XP015008112, NFC 2328, 245 pages.
European Patent Office, "Supplementary Search Report", application No. EP 04812468, dated May 27, 2010, 4 pages.
CLAIMS, application No. EP 04812468, 4 pages.
U.S. Appl. No. 10/719,003, filed Nov. 21, 2003, Office Action Mailing Date May 9, 2007.

* cited by examiner

METHOD AND APPARATUS FOR DETERMINING A DATA COMMUNICATION NETWORK REPAIR STRATEGY

FIELD OF THE INVENTION

The present invention generally relates to data communication networks. The invention relates more specifically to a method and apparatus for determining a data communication network repair strategy.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of links (communication paths such as telephone or optical lines) and nodes (usually routers directing the packet along one or more of a plurality of links connected to it) according to one of various routing protocols.

De-activation of a network component, i.e. a link or a node, either by component failure or by planned downtime, needs to be managed in order to avoid the risk of packet loss. In known systems, such de-activations cause routing transitions to take place, during which distributed routing algorithms may open up an alternative route. However such transitions can be slow, of the order of seconds before convergence and in the interim data can be lost. Although packet loss is commonly dealt with by higher level protocols that re-send packets, the inherent delays can adversely affect time critical functions such as voice and pseudo-wire traffic.

One solution for providing backup routes is described in a co-pending patent application entitled "Method and Apparatus for Constructing a Backup Route in a Data Communications Network," Ser. No. 10/340,371 filed 9 Jan. 2003, of Clarence Filsfils et al., Attorney Docket No. 50325-0734 ("Filsfils et al."), the entire contents of which are incorporated by reference for all purposes as if fully set forth herein.

According to the solution put forward in Filsfils et al., a repairing node re-computes a repair path for each adjacent component such that if component failure is detected the repair path can be instituted. The adjacent component can be a link or a node. If the adjacent component is a link then the repair path only needs to be computed to the node at the far side of the failed link from the repairing node. If the failed component is an adjacent node then a repair path must be formed to each neighbor of the failed node. Accordingly it is preferable to perform link repair, as it is simpler. Also, if an adjacent node is a "single point of failure", i.e. it is the only node providing a path from the repairing node to some or all nodes on the network, then unless a link repair strategy can be adopted those nodes will not be reachable.

Figure 1:
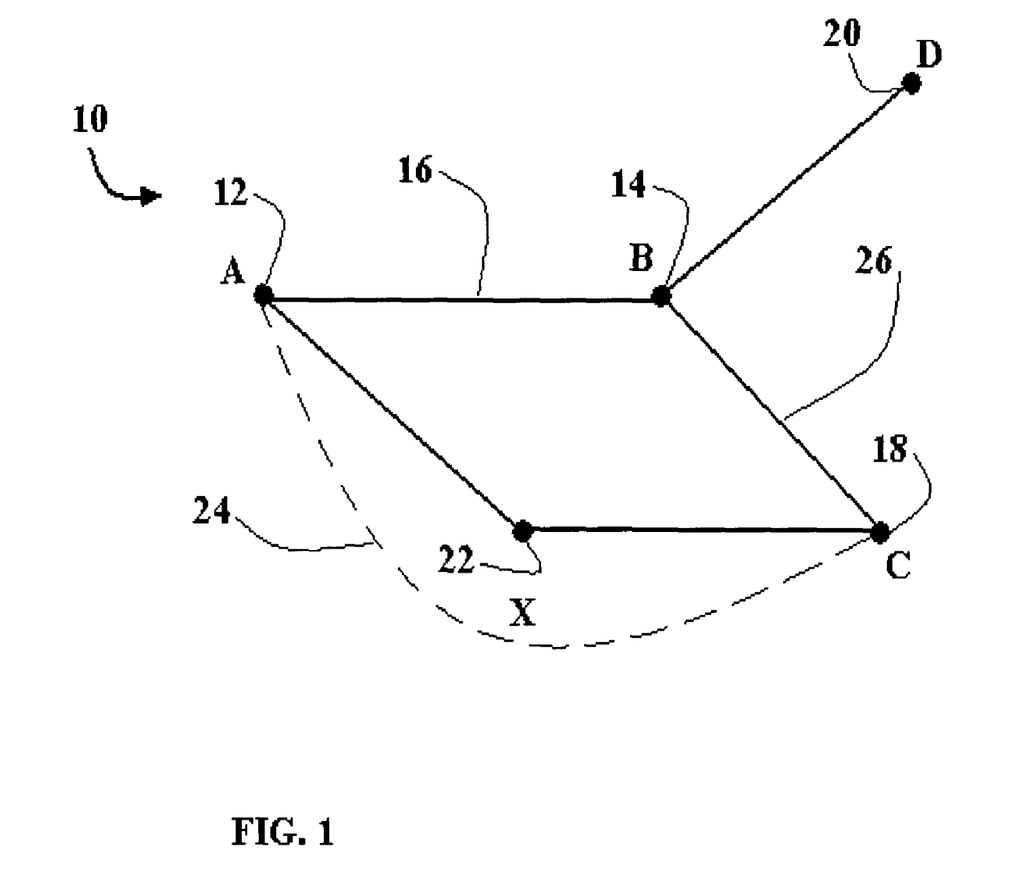
FIG. 1 is a network diagram showing implementation of a repair strategy.

However such an approach can give rise to "forwarding loops" as can be better understood with reference to FIG. 1, which is a network diagram showing implementation of a repair strategy. The network is designated generally 10 and includes a repairing node A designated 12 an adjacent node B designated 14 and an adjacent link 16 joining nodes A and B. Node B has two further neighbor nodes, node C designated 18 and node D designated 20. Node A has an alternative route to node C via node X (designated 22) along repair path 24. The link between node C and node B is designated 26.

If node A detects a failure of an adjacent component, which can either be link 16 or node B, and assumes that it is a link failure, then it will invoke its pre-computed link repair strategy and forward data to node B via nodes X and C. If the assumption is correct and link 16 has failed then the traffic will be successfully forwarded to node B from which it can continue to its destination. However if, in fact, node B has failed then, assuming that node C is acting independently as a repairing node, it too will have invoked a repair strategy using the repair path CXAB. As a result when a packet from node A reaches node C it will be returned from node C via node A with destination node B. On receiving this packet node A will try to forward it to node C once again, thus looping the packet. This is termed a forwarding loop.

When a failure is detected by the repairing node it is not possible to determine immediately whether it is the adjacent link or the adjacent node that has failed. Accordingly a safe approach is to institute a node repair strategy as, if a link repair strategy is implemented and in fact it is the adjacent node that has failed, then data traffic will be forwarded to a failed node and lost. Although it is undesirable to set up incorrectly a link repair strategy when in fact node failure has occurred, if it is possible to adopt a link repair strategy then components on the network to which the adjacent node is a single point of failure are reachable. This can also be seen in FIG. 1. In particular node D is reachable only via node B and so, if possible, it would be desirable for node A to forward packets to node B destined for node D via path AXCB by implementing a link repair strategy.

One known approach to loop detection is described in document "A probe method in MPLS loop avoidance" by Wang Yahong ("Wang") which is available at the time of writing on the file "draft-wang-mpls-loop-probe-00.txt" in the directory "pub/id" of the domain "watersprings.org" on the World Wide Web. The approach of Wang relates to loop detection when a next hop at a node is changed for a given destination. In that case the node sends a specific probe packet via the new next hop. If the probe packet is subsequently intercepted by the originating node then this signifies that a loop is occurring. The Wang approach recites two methods, an optimistic and a pessimistic method. In the optimistic method, if no loop is detected before a timer expires then the node assumes that the next hop path is loop free. In the pessimistic method the probe message requires an acknowledge message from a destination node. In this case if a probe packet is subsequently intercepted within a time out period or no acknowledgement message is received from the destination node in that period then a loop is assumed. If a loop is detected then an alternative repair path is attempted.

Various problems arise with the Wang approach. In particular the manner in which paths are adopted is trial and error and there is no guarantee that, if a loop is detected on the first path, similar problems will not arise on subsequently attempted paths. Furthermore, in the pessimistic method, all possible destination nodes need to be configured to recognise a probe message and return a probe acknowledgement, increasing the processing overhead and the number of routers that need to understand the loop detection protocol.

A further known approach is described in U.S. patent application Ser. No. 10/171,395, filed Jun. 12, 2002, entitled "Distinguishing Between Link and Node Failure to Facilitate Fast Reroute," of Anna Charny et al. (Charny et al.), according to which nodes exchange RSVP hellos with neighbour nodes, such that if no response is received it is inferred that the neighbour node has failed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for determining a data communication network repair strategy is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview
3.0 Method of Determining a Data Communication Network Repair Strategy
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for determining a data communication network repair strategy for a data communications network of nodes and links. The method includes the step of implementing a link repair strategy for an adjacent link connected to an adjacent node. The method further comprises the step of monitoring for a probe packet to the adjacent node. The method further comprises the step of implementing a node repair strategy if said probe packet is received.

In other aspects, the invention encompasses a computer apparatus and a computer-readable medium configured to carry out the foregoing steps.

2.0 Structural and Functional Overview

Figure 2:
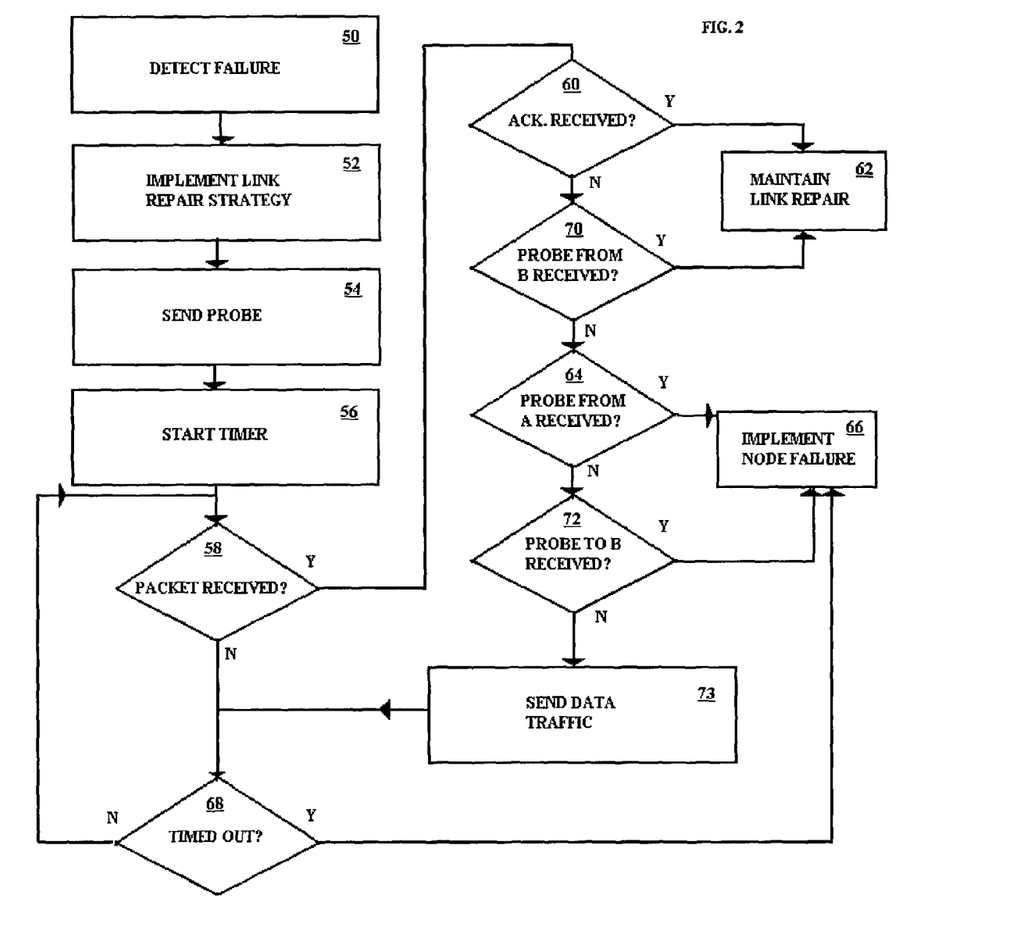
FIG. 2 is a flow diagram illustrating a high level review of a method for determining a repair strategy.

Returning to FIG. 1 which is a network diagram showing implementation of a repair strategy, the approach adopted can be understood with reference to FIG. 2 which is a flow diagram illustrating a high level overview of a method for determining a repair strategy. For purposes of illustrating a clear example, the process of FIG. 2 is described herein with reference to FIG. 1. However, the process of FIG. 2 is not limited to the context of FIG. 1, and may be applied to any network to solve the problems contemplated by this disclosure.

In block 50 of FIG. 2, node A of FIG. 1 detects a failure along the link 16 which may be the adjacent link 16 itself or the adjacent node, node B to which it is connected. In block 52 node A implements a link repair strategy along repair path 24 and link 26. Before any normal data packets are transmitted over the repair path 24 a loop detection packet or probe is sent along the repair path in block 54. At the same time, in block 56 a timer is started with period t. In block 58 the node monitors to see if a packet is received. If it is then a loop detection subroutine starts at block 60. If node B has not failed and is still reachable then the probe will be received by node B and an acknowledgement sent to node A. Accordingly if, in block 60, an acknowledgement is received this means that the link repair strategy is appropriate; therefore, the link repair strategy is maintained in block 62. Otherwise, at block 64 node A monitors for a return of the probe from another node (rather than an acknowledgement from node B). If this is received then this implies that the node has failed as what has actually been detected is that a packet addressed to B loops back to A. This implies that some intermediate node on the path from A to B (say C) has noticed that node B has failed and has implemented a repair strategy which involved packets addressed to B being forwarded via A. Accordingly in block 66 a node repair strategy is implemented. This node repair strategy may be to construct repair paths to all neighbors of the failed node or may be another strategy such as awaiting normal convergence. Any other packet received is forwarded as normal in block 73 and the system then checks for time out at block 68 as discussed below.

It is possible that a loop is occurring, but because of severe congestion the loop detection packet itself is lost. In this case node A will receive neither a response from node B nor a return of the probe. Accordingly at block 68, if the timer times out after time t then it is assumed that there is node failure and the node failure strategy is invoked. Otherwise the routine returns to block 58 to monitor for further packets. In an optimization, rather than assuming node failure after the timer has timed out once, the process can be repeated n successive times, for example 3 times, a probe being sent each time. If the timer expires n successive times without a response it is assumed that node B has failed. This reduces the probability of the probe detector generating a false negative and declaring a node failure, when there is only a link failure.

In a further optimization, if the failure of link 16 has been detected by node B it may have implemented its own probe. If node A identifies this in optional block 70 then it can infer that node B is alive and maintain the link repair strategy in block 62.

In a still further optimization if node A receives a probe from another node destined for node B then in block 72 it can infer once again that node B has failed (as another neighbor node is presumed to be implementing a link repair strategy such that the likelihood is that node B, rather than multiple links to node B, has failed). Accordingly in optional block 72, when such a probe packet is received, a node failure repair strategy is implemented in block 66.

Where it is detected that link repair is failing the repair path is disabled in block 66. The repair path is disabled for two reasons, first of all to stop the waste of network resource incurred by needlessly sending undeliverable packets over the network, but more significantly in order to break any loops.

3.0 Method of Determining a Data Communication Network Repair Strategy

As discussed above in overview, once a link repair strategy is initiated then as a first step a loop detection packet or probe is sent by the repairing node. The link repair strategy is withdrawn if the probe is looped back to the sender. In an optimization the probe is a packet addressed to node B with source address A encapsulating a second packet with source address B and destination address A. The complete packet is transmitted over the link repair path 24 to node B and is subject to repair path tunneling where necessary. In one embodiment, the probe is of the form: A B(loop detect ack B A). This has the following meaning:

(loop detect ack B A) is a loop-detection acknowledgement message addressed from B to A. This is sent by B, to indicate that it has received A's loop detection message and that B is alive.

A B(loop detect ack B A) is therefore B's loop-detection acknowledgement message encapsulated in a packet addressed from A to B.

As a result a simple protocol is adopted which does not require formulation of a specific acknowledgement packet. Instead, if node B is still reachable, the probe is received by node B, decapsulated and the inner packet returned to A.

Figure 3:
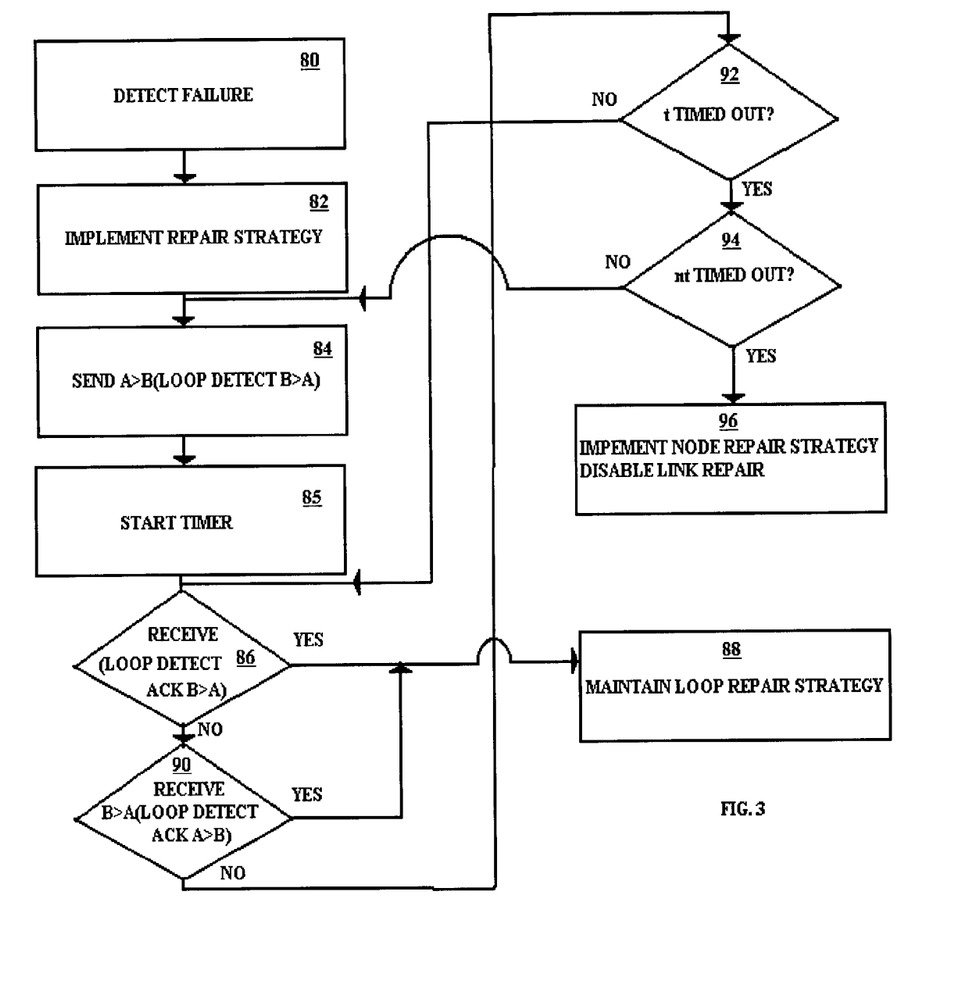
FIG. 3 is a flow diagram illustrating in more detail a method for determining a repair strategy.

FIG. 3 is a flow diagram illustrating in more detail a method for determining a repair strategy. In block 80 a repairing node first detects a failure and in block 82 implements a link repair strategy as discussed in more detail above. In block 84 node A first sends a probe packet. In one embodiment, the probe packet is in the form A B(loop detect ack B A). By transmitting the first loop detecting packet in advance of any other data, the probability of congestion loss is minimized.

In block 85 a timer is started with time t, as discussed above. The repairing node A then monitors for receipt of the message (loop detect ack B A) in block 86. If this is received then node B is alive and the link repair strategy is maintained at block 88.

If the link 16 has indeed failed, then node B may be probing to see if node A is alive. Accordingly, in block 90 node A further monitors for a packet B A(loop detect ack A B), i.e. the probe packet from node B. If the probe packet from node B is received, then in block 88 the link repair strategy is maintained in block 88.

If A does not get a response before t expires in block 92, it resends the probe to node B at block 84 and restarts the timer at block 85. If the timer has timed out then, in block 94, if n, for example 3, attempts have failed then A assumes that B has failed, disables the link repair strategy and implements the node repair strategy in block 96. Appropriate strategies are discussed in more detail below. Otherwise the procedure is repeated, and the probe message is resent in block 84.

In an optimization the probes are issued periodically during normal data traffic via the repair path 42 in case B is in the process of failing.

As discussed above, in block 88, if the repairing node A determines that node B is alive it maintains the link repair strategy.

It will be seen, therefore, that the approach of FIG. 3 allows implementation of an appropriate repair strategy also taking into account additional factors. In some instances even though B is alive the repair path is disabled, principally when the timer times out.

Where node B has in fact failed, then in a further optimization the method makes use of other neighbor nodes of the failed node, in the current embodiment, node C (designated 18 in FIG. 1). This can be illustrated by considering various possible cases.

In a first case where node B has failed, node C is not aware of failure of the node B, nor of the link 26 between them. This case can be understood with reference to FIG. 4, which is a flow diagram illustrating the behavior of a neighbor node in a method for determining a repair strategy.

Figure 4:
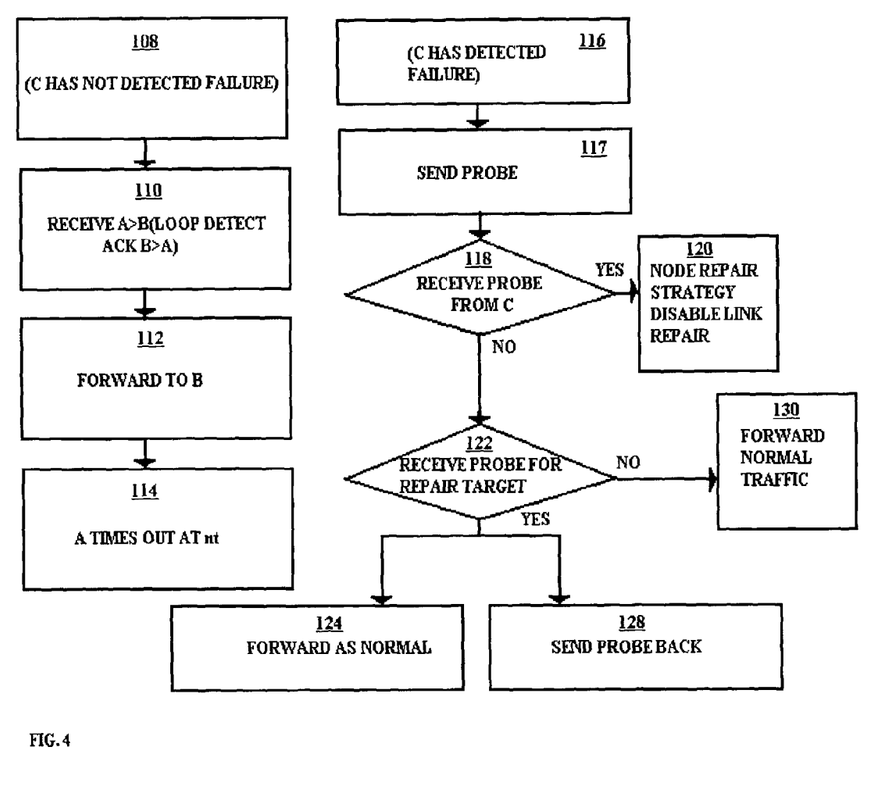
FIG. 4 is a flow diagram illustrating the behavior of a neighbor node in a method for determining a repair strategy.

In block 108 it is assumed that C has not detected the failure. In block 110 node C receives the probe packet from node A destined to node B. In one embodiment, the probe packet is in the form A B(loop detect ack B A). In block 112 node C forwards the probe message to B as it does any other traffic to B. The message is discarded. There is no packet looping and the traffic volumes everywhere are the same as if B were functional. Eventually in block 114 at node A the timer at time nt expires and, as discussed above, in block 96 in FIG. 3 node A removes the link repair path in relation to the traffic to node D (designated 20) via node C.

In the second case node C has detected the failure as represented by block 116. In block 117 node C originates a probe. In block 118, node C monitors for the probe and if it receives it then a loop is occurring and the node repair strategy is implemented and the link repair strategy disabled in block 120. In block 122 if node C receives a packet from another originator destined for node B (or more generally for the repair target of a link repair strategy that is currently implementing) then there is the risk of the probe packet being looped back to its originator as discussed in more detail above.

One approach to dealing with this is simply to forward the packet as normal, in which case the probe packet will be received once again by the originator, which will detect a loop and take the necessary steps as discussed above. This is shown in block 124.

Alternatively, at block 128 node C can send its own probe to node B via the originator node (in this case, node A) of the received probe packet. As discussed above in block 72 in FIG. 2, such a probe packet is received by the originator node and recognized as designating a loop such that the originator implements the appropriate strategy. The preferred implementation is that described with reference to block 124, as this is less likely to trigger successive responses between nodes A and C. In one embodiment, to avoid the risk of repeat messages triggered between the nodes, node C sends its probe as soon as it has modified its routing table entry for node B but not before, and when about to tear down the repair path should start with the entry that points to node B.

Of course when other traffic is received then the packet should be forwarded as normal over the regular forwarding path or the appropriate repair path as designated by block 130.

It will be appreciated that the method discussed above can be implemented on all nodes or on a sub-set of nodes, in the case for example of asymmetric routing. Accordingly, in one embodiment it is sufficient for a node merely to monitor for probe traffic between itself and the potentially failed node. Alternatively the repairing node can also monitor for appropriate traffic from the neighbor nodes to the potentially failed node.

Where a loop is detected as a result of node failure, the appropriate repair strategy subsequently can be dependent on various factors. As examples, two particular cases are now considered.

Firstly where node B is a single point of failure for all traffic assigned to the link repair path, that is to say, the only traffic assigned to the link repair path is for destinations reachable only via B, all these destinations will be unreachable even after normal convergence has completed. Accordingly having made use of the link repair path will not have made matters worse in terms of packet delivery, but continued looping is undesirable in any event. Accordingly the repair path is withdrawn and packets discarded at node A.

In the second case some traffic is assigned to the link repair path because it is not possible to compute a repair path to a neighbor of node B, for example because the underlying repair path strategy is unable to compute an appropriate path. After normal convergence these destinations will be reachable but in the meantime packets directed to them will loop as discussed above. Accordingly, in this event, normal convergence is immediately initiated in the appropriate manner.

In other cases a pre-determined node repair strategy can be adopted as soon as it is inferred that node B has failed. In order to break any loops in the meantime any appropriate approach can be adopted. For example the repairing node can delete from its forwarding information base (FIB) all prefixes that have a normal next-hop equal to the destination address of the loop-detection packet (i.e. the failed node) and also flush the loop-detect packet.

The mechanism by which the repair paths are stored and implemented and the detection, monitoring and forwarding of probes and other data packets will be apparent to the skilled reader such that a detailed description is not required here. Although any appropriate protocol can be adopted, assigning the loop discovery protocol an IP protocol type will make packet discrimination in the repair path easier, and for the specific probe form discussed above a packet protocol that supports tunneling is required.

4.0 Implementation Mechanisms—Hardware Overview

Figure 5:
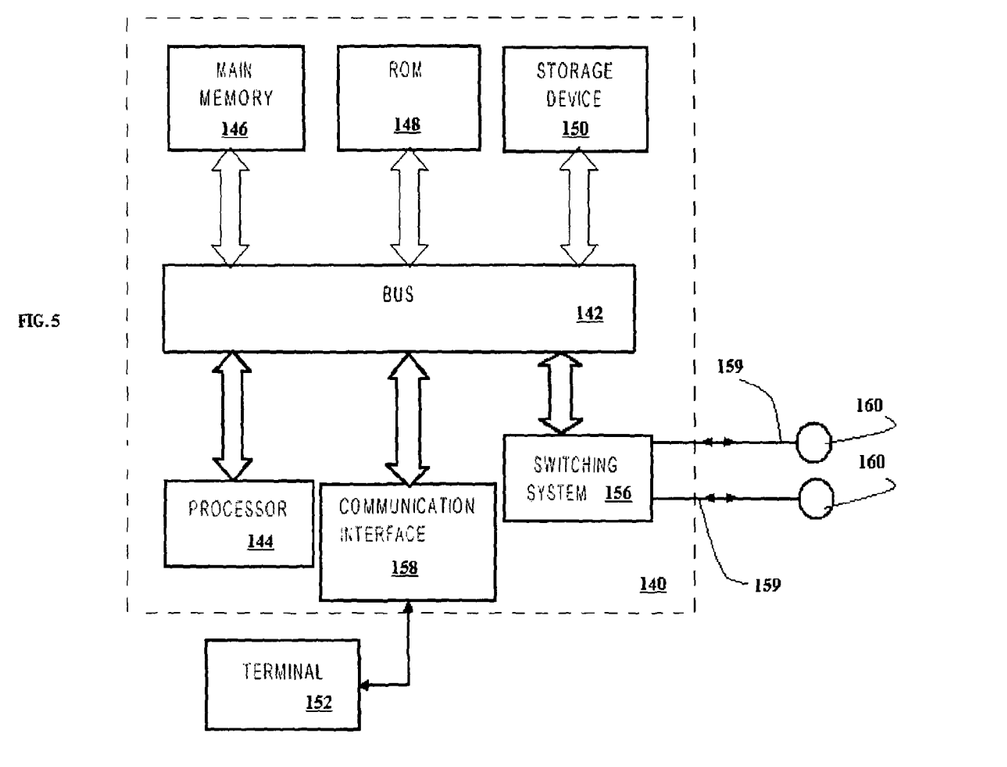
FIG. 5 is a block diagram that illustrates a computer system upon which a method for determining a repair strategy may be implemented.

FIG. 5 is a block diagram that illustrates a computer system 140 upon which the method may be implemented. The method is implemented using one or more computer programs miming on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 also may be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a repairing node the above described method of determining a repair strategy or a link 159 or the router 160 connected to it comprises the adjacent component. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 144 for execution. Such a medium may take many forms, including but not limited to, non-volatile media, and volatile media. Non-volatile media includes, for example, optical or magnetic disks, such as storage device 150. Volatile media includes dynamic memory, such as main memory 146.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet".

Computer system 140 can send messages and receive data, including program code, through the network(s), network link and interface 159. In the Internet example, a server might transmit a requested code for an application program through the Internet, ISP, local network and communication interface 158. In accordance with the invention, one such downloaded application provides for the method as described herein.

The received code may be executed by processor 144 as it is received, and/or stored in storage device 150, or other non-volatile storage for later execution.

5.0 Extensions and Alternatives

Any appropriate routing protocol and mechanism can be adopted to implement the invention. The method step set out can be carried out in any appropriate order and aspects from the examples and embodiments described juxtaposed or interchanged as appropriate.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of determining a repair strategy for a data communication network of nodes and links comprising the steps of:
   at an originator node:
      in response to detecting a failure in communicating with a destination node, implementing a link repair strategy by computing a first repair path around an adjacent link connected to the destination node;
      creating timer period for testing the first repair path;
      sending a first probe packet along the first repair path to the destination node, the first probe packet having the originator node as a source and the destination node as a destination;
      monitoring for a second probe packet having the destination node as a destination, sent by the destination node in response to receiving the first probe packet from the originator node; and
      in response to receiving the second probe packet, from the destination node during the timer period, forwarding data traffic to the destination node via the first repair path;
      in response to not receiving the second probe packet from the destination node during the timer period, computing a second repair path around the adjacent link to the destination node;
   wherein the method is performed by one or more computing devices.

2. A method as claimed in claim 1, wherein the received probe packet having the destination node as the destination has one of the nodes other than the destination node or the originator node as a source.

3. A method as claimed in claim 2 further comprising:
   receiving a probe packet having a source node as a source and the destination node as a destination; and
   looping the probe packet having a source node as a source and the destination node as a destination back to the source node.

4. A method as claimed in claim 2 further comprising:
   receiving a probe packet having a source node as a source and the destination node as a destination; and
   sending a probe packet having the destination node as a destination to the source node.

5. A method as claimed in claim 1, further comprising:
   monitoring for an acknowledgement to the first probe packet having the originator node as a source and the destination node as a destination; and
   in response to not receiving the acknowledgement during the timer period, implementing a node repair strategy for the destination node.

6. A method as claimed in claim 5 in which the step of implementing the node repair strategy comprises implementing a node repair path.

7. A method as claimed in claim 5 in which the step of implementing the node repair strategy comprises disabling a link repair strategy.

8. A method as claimed in claim 1 in which the first probe packet having the destination node as a destination encapsulates an acknowledgement packet.

9. A non-transitory computer readable volatile or non-volatile storage medium storing one or more sequences of instructions for determining a repair strategy for a data communication network of nodes and links which instructions, when executed by one or more processors, cause the one or more processors to perform the steps of:
   at an originator node:
      in response to detecting a failure in communicating with a destination node, implementing a link repair strategy by computing a first repair path around an adjacent link connected to the destination node;
      creating a timer period for testing the first repair path;
      sending a first probe packet along the first repair path to the destination node, the first probe packet having the originator node as a source and the destination node as a destination;
      monitoring for a second probe packet having the destination node as a destination, sent by the destination node in response to receiving the first probe packet from the originator node; and
      in response to receiving the second probe packet from the destination node during the timer period, along the first repair path from the second probe packet having the destination node as the destination, forwarding data traffic to the destination node via the first repair path;
      in response to not receiving the second probe packet from the destination node during the timer period, computing a second repair path around the adjacent link to the destination node.

10. The non-transitory computer readable medium as recited in claim 9, wherein the received probe packet having the destination node as the destination has one of the nodes other than the destination node or the originator node as a source.

11. The non-transitory computer readable medium as recited in claim 9, wherein the one or more sequences of instructions further comprise instructions for:
   monitoring for an acknowledgement to the first probe packet having the originator node as a source and the destination node as a destination; and
   in response to not receiving the acknowledgement during a timer period, implementing the node repair strategy for the destination node.

12. The apparatus as recited in claim 11, wherein the instructions in the non-transitory computer readable medium for implementing the node repair strategy comprise instructions for implementing a node repair path.

13. An apparatus for determining a repair strategy for a data communication network of nodes and links comprising:
   one or more processors;
   means for the originator node implementing a link repair strategy by computing a first repair path around an adjacent link connected to a destination node in response to detecting a failure in communicating with the destination node;
   means for the originator node creating a timer period for testing the first repair path;
   means for the originator node sending a first probe packet along the first repair path to the destination node, the first probe packet having the originator node as a source and the destination node as a destination;
   means for the originator node monitoring for a second probe packet having the destination node as a destination, sent by the destination node in response to receiving the first probe packet from the originator node; and
   means for the originator node forwarding data traffic to the destination node via the first repair path in response to receiving the second probe packet from the destination node during the timer period, along the first repair path, the second probe packet having the destination node as the destination;
   means for the originator node computing a second repair path around the adjacent link to the destination node in response to not receiving the second probe packet from the destination node during the timer period.

14. An apparatus as claimed in claim 13 wherein the received probe packet having the destination node as the destination has one of the nodes other than the destination node or the originator node as a source.

15. An apparatus as claimed in claim 14 further comprising:
   means for receiving a probe packet having a source node as a source and the destination node as a destination; and
   means for looping the probe packet having a source node as a source and the destination node as a destination back to the source node.

16. An apparatus as claimed in claim 14 further comprising:
   receiving a probe packet having a source node as a source and the destination node as a destination; and
   means for sending a probe packet having the destination node as a destination to the source node.

17. An apparatus as claimed in claim 13 further comprising:
   means for monitoring for an acknowledgement to the first probe packet having the originator node as a source and the destination node as a destination; and
   means for implementing the node repair strategy for the destination node in response to is not receiving the acknowledgement during the timer period.

18. An apparatus as claimed in claim 17 in which the means for implementing the node repair strategy comprises means for implementing a node repair path.

19. An apparatus as claimed in claim 17 in which the means for implementing the node repair strategy comprises means for disabling the link repair strategy.

20. An apparatus as claimed in claim 13 in which the first probe packet having the destination node as a destination encapsulates an acknowledgement packet.

21. An apparatus for determining a repair strategy for a data communication network of nodes and links, the apparatus comprising:
   one or more processors;
   a network interface communicatively coupled to the processor and configured to communicate one or more packet flows among the processor and a network; and
   a non-transitory computer readable volatile or non-volatile storage medium storing one or more sequences of instructions for determining a repair strategy for a data communication network of nodes and links, which instructions, when executed by the one or more processors, cause the one or more processors to perform the steps:
   at an originator node:
   in response to detecting a failure in communicating with a destination node, implementing a link repair strategy by computing a first repair path around an adjacent link connected to the destination node;
   creating a timer period for testing the first repair path;
   sending a first probe packet along the first repair path to the destination node from the first probe packet having the originator node as a source and the destination node as a destination;
   monitoring for a second probe packet from the destination node, having the adjacent node as a destination, sent by the destination node in response to receiving the first probe packet from the originator node; and
   in response to receiving the second probe packet as from the destination node during the timer period, implementing a node repair strategy for forwarding data traffic to the destination node via the first repair path;
   in response to not receiving the second probe packet from the destination node during the timer period, computing a second repair path around the adjacent link to the destination node.

22. The apparatus as recited in claim 21, wherein the received probe packet having the destination node as the destination has one of the nodes other than the destination node or the originator node as a source.

23. The apparatus as recited in claim 22, wherein the non-transitory computer readable medium further comprises instructions for:
   receiving a probe packet having a source node as a source and the destination node as a destination; and looping the probe packet having a source node as a source and the destination node as a destination back to the source node.

24. The apparatus as recited in claim 22, wherein the non-transitory computer readable medium further comprises instructions for:
   receiving a probe packet having a source node as a source and the destination node as a destination; and sending a probe packet having the destination node as a destination to the source node.

* * * * *